United States Patent [19]

Morishita et al.

[11] Patent Number: 4,913,689
[45] Date of Patent: Apr. 3, 1990

[54] PULLEY WITH A HIGH-FRICTION GROOVE SURFACE AND MANUFACTURING METHOD THEREFOR

[75] Inventors: Akira Morishita; Toshinori Tanaka, both of Himeji, Japan

[73] Assignee: Mitsubishi Denki Kabushiki Kaisha, Tokyo, Japan

[21] Appl. No.: 271,969

[22] Filed: Nov. 16, 1988

[30] Foreign Application Priority Data

Dec. 4, 1987 [JP] Japan .................. 62-308198

[51] Int. Cl.⁴ .................................... F16H 55/49
[52] U.S. Cl. ................................ 474/170; 474/174
[58] Field of Search ............ 474/174, 178, 184–187, 474/168, 170, 190

[56] References Cited

U.S. PATENT DOCUMENTS

| | | | |
|---|---|---|---|
| 4,473,363 | 9/1984 | McCutchan, Jr. | 474/170 X |
| 4,518,374 | 5/1985 | Kanemitsu | 474/170 |
| 4,528,470 | 3/1985 | Young | 310/78 |
| 4,543,923 | 9/1985 | Hamano | 123/179 F |
| 4,558,668 | 7/1985 | Yabunaka | 123/195 A |
| 4,781,660 | 11/1988 | Amataka et al. | 474/17 X |

FOREIGN PATENT DOCUMENTS

| | | | |
|---|---|---|---|
| 0014652 | 2/1981 | Japan | 474/170 |
| 0125458 | 7/1985 | Japan | 474/170 |

*Primary Examiner*—Thuy M. Bui
*Attorney, Agent, or Firm*—Sughrue, Mion, Zinn, Macpeak & Seas

[57] ABSTRACT

A pulley comprising a circumferential groove which has a non-flat groove surface for increased friction against a belt to be received and a manufacturing method therefor. According to the method a pulley material is forged into a basic pulley configuration which is the shape of the material ready for forming the circumferential groove. The basic configuration comprises a plurality of axial grooves which extend in a generally axial direction over a surface of the pulley in which the circumferential groove is to be formed. Then the circumferential groove is rolling-formed in the pulley material. Thus, a non-flat groove surface for a higher friction is provided. Alternatively, the higher friction groove surface may be formed by roughening a sand blasting, shot blasting or chemical surface treatment.

2 Claims, 1 Drawing Sheet

PULLEY WITH A HIGH-FRICTION GROOVE SURFACE AND MANUFACTURING METHOD THEREFOR

BACKGROUND OF THE INVENTION

This invention relates to a pulley having a high-friction circumferential groove for receiving a friction-belt therein and a manufacturing method therefor.

FIGS. 1 to 4 illustrates one example of conventional steps for manufacturing a conventional pulley for use with a friction belt. The illustrated pulley is the one for the alternator for use in a vehicle. According to the conventional manufacturing method, as shown in FIG. 1, a solid, drum-shaped piece of a forgeable steel blank material 1 is prepared. This solid blank material 1 is first cold forged into a cup-shaped material 2 with a first flange 3 at the bottom of it as shown in FIG. 2. Then the cup-shaped material 2 is again cold forged into a cup 4 with a second flange 5 at the open edge of the cylindrical wall of the cup 4. It is seen that the a cylindrical surface 6 in which circumferential grooves for receiving friction belts (not shown) such as V-belts are formed is defined between the first and the second flanges 3 and 5. A central bore 7 is also formed at this stage. Thus, a basic pulley configuration is obtained at this stage. Finally, as shown in FIG. 4, circumferential grooves 8 for receiving friction belts (not shown) therein are formed in the cylindrical surface 6 between the first and the second flanges 3 and 5 to obtain a finished pulley 9. The circumferential grooves 8 are usually V-grooves as shown in FIG. 4. Such pulley 9 can be used in a vehicular alternator together with a V-belt (not shown) with a plurality of V-grooves.

However, since the circumferential grooves 8 in the pulley 9 are formed by rolling, they have groove surfaces which are very smooth. Therefore, the coefficient of friction of the groove surfaces of the grooves 8 relative to the friction belt is very low, often causing a slippage between the pulley 9 and the belt on it.

SUMMARY OF THE INVENTION

Accordingly, an object of the present invention is to provide a pulley having a higher friction between the circumferential pulley groove and a friction belt to be received therein.

Another object of the present invention is to provide a pulley having a circumferential groove which has a non-flat groove surface for increased friction relative to a friction belt to be received therein.

Anothr object of the present invention is to provide a pulley having a groove of a higher friction which can be easily manufactured.

Another object of the present invention is to provide a method for manufacturing a pulley having a higher friction between a pulley groove and a friction belt.

A further object of the present invention is to provide a relatively simple method for manufacturing a pulley having a higher friction between a pulley groove and a friction belt.

With the above objects in view, the pulley of the present invention comprises a pulley body having a circumferential groove which has a non-flat groove surface for increased friction against a belt to be received therein. The non-flat groove surface may have a plurality of axial grooves which extend in a generally axial direction or a roughened surface.

According to the method of manufacturing a pulley of the present invention, a pulley material is forged into a basic pulley configuration which is the shape of the material ready for forming the circumferential groove. The basic configuration comprises a plurality of axial grooves which extend in a generally axial direction over a surface of the pulley in which the circumferential groove is to be formed. Then the circumferential groove is rolling-formed in the pulley material. Thus, a non-flat groove surface for a higher friction is provided. Alternatively, the higher friction groove surface may be formed by roughening the surface by sand blasting, shot blasting or chemical surface treatment.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 5:
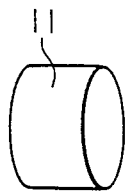
FIG. 5 is a perspective view showing a solid, drum-shaped piece of a forgeable steel blank material for the manufacture of the pulley according to the manufacturing method of the present invention.
Figure 9:
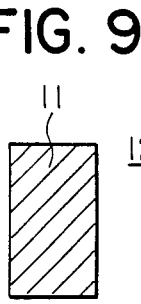
FIGS. 9 to 12 are sectional views taken along central axises of the materials shown in FIGS. 5 to 8, respectively.

FIGS. 5 to 8 illustrate an embodiment of the method for manufacturing a pully of the present invention and a pulley of the present invention having circumferential grooves. FIGS. 9 to 12 are sectional view of the materials shown in FIGS 5 to 8, respectively, taken along their central axes. The illustrated pulley is the one for the alternator for use in a vehicle. As shown in FIGS. 5 and 9, a solid, drum-shaped piece of a forgeable steel blank material 11 for the pulley body is prepared.

Figure 6:
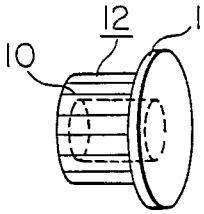
FIG. 6 is a perspective view of a cup-shaped material with a first flange at its bottom as well as a plurality of axial grooves forged from the blank material of FIG. 5 according to the present invention.
Figure 10:
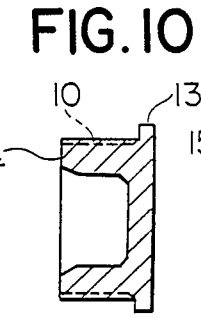

This solid blank material 11 is first cold forged into a cup-shaped material 12 with a first flange 13 at the botom of it as shown in FIGS. 6 and 10. According to the present invention, a plurality of axial grooves 10 are cold forged at the same time the blank material 11 is cold forged into the flanged cup-shaped material 12. The axial grooves 10 extend in the axial direction in the cylindrical surface of the cup-shaped material 12.

Figures 7, 8:
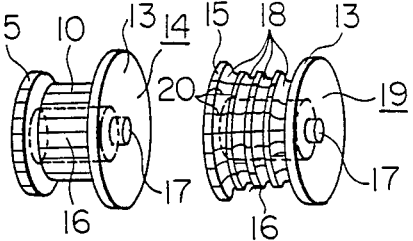
FIG. 7 is a perspective view of an axially-grooved cup with a second flange cold forged from the material shown in FIG. 6 according to the present invention, the cup being ready for rolling.
FIG. 8 is a completed pulley with circumferential grooves formed by rolling according to the present invention.
Figure 11:
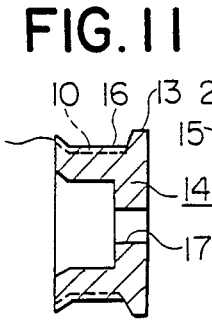

Then, as shown in FIGS. 7 and 11, the cup-shaped material 12 is again cold forged into a cup 14 with a second flange 15 at the open edge of the cylindrical wall of the cup 14. It is seen that a cylindrical surface 16 in which friction belts (not shown) such as V-belts are to be formed is defined between the first and the second flanges 13 and 15. A central bore 17 is also formed at this stage. Since this cup-shaped member 14 is ready for rolling in which the circumferential grooves 18 (FIGS. 8 and 12) are formed and the basic pulley configuration is given, the cup-shaped member 14 may also be referred to as a basic pulley configuration 14.

Figure 12:
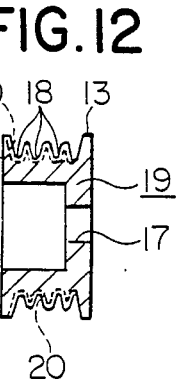

Finally, as shown in FIGS. 8 and 12, the circumferential grooves 18, extending in parallel to each other in the circumferential direction, for receiving friction belts (not shown) therein are formed in the cylindrical surface 16 between the first and the second flanges 13 and 15 of the basic pulley configuration 14 to obtain a finished pulley 19. The circumferential grooves 18 are usually V-grooves as shown in the FIGS. 8 and 12. Such pulley 19 can be used in a vehicular alternator together with a V-belt (not shown) with a plurality of V-grooves.

As seen from FIGS. 8 and 12, according to the present invention, each of the circumferential grooves 18 is provided with a plurality of axial grooves 20 which generally axially extend over the substantially entire axial length of the pulley 19 except for the first flange 13. It is to be noted that the axial grooves 20 extend not only in the bottom surface of the circumferential grooves 18 but also in the sloped side wall surfaces of the circumferential grooves 18. Therefore, the groove surfaces of the circumferential grooves 18 and the pulley 19 are non-flat, wavy groove surfaces due to the generally axial grooves 20 extending across the circumferential grooves 18. Accordingly, the groove surface of the circumferential grooves 18 provides a high friction relative to the frictiona belt to be used with the pulley 19.

As has been described, according to the present invention, a pulley having a higher friction between the circumferential pulley groove and a friction belt to be received therein can be obtained. Therefore the slippage of the friction belt on the pulley can be significantly reduced. Also, according to the method for manufacturing a pulley of the present invention, a pulley having a higher friction beywueen a pulley groove and a friction belt can be relatively easily manufactured.

Figure 1:
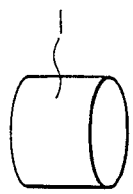
FIG. 1 is a perspective view showing a solid, drum-shaped piece of a forgeable steel blank material for the manufacture of the pulley according to the conventional method.
Figure 2:
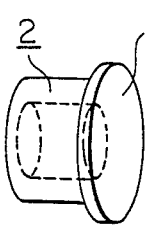
FIG. 2 is a perspective view of a cup-shaped material with a first flange at its bottom forged from the blank material according to the conventional method.
Figure 3:
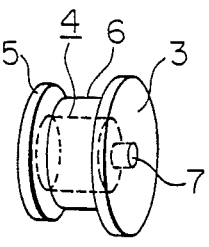
FIG. 3 is a perspective view of a cup with a second flange cold forged from the material shown in FIG. 2 according to the conventional method, the cup being ready for rolling.
Figure 4:
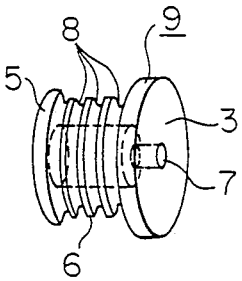
FIG. 4 is a completed pulley with circumferential grooves formed by rolling according to the conventional method.
Figure 13:
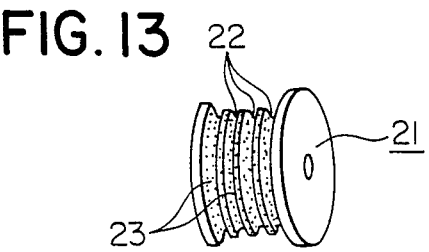
FIG. 13 is a perspective view illustrating another embodiment of the pulley of the present invention.

FIG. 13 illustrates another embodiment of the pulley of the present invention in which the circumferential grooves 22 have roughened surfaces 23. This pulley 21 can be manufactured by roughening the groove surfaces of the V-shaped circumferential grooves of the conventional pulley shown in FIG. 4. The roughening may be achieved by shot blasting or sand blasting. Alternatively, the groove surfaces may be roughened by a chemical treatment. This roughening is a relatively simple process. The roughened surfaces thus formed also provide a higher friction relative to an unillustrated friction belt such as a V-belt. Accordingly, this embodiment provides many advantageous results similar to those previously explained in conjunction with the previous embodiment.

What is claimed is:
1. A pulley (19), comprising:
   (a) a central, generally cylindrical body portion,
   (b) first (13) and second (15) flanges respectively defined at opposite ends of the body portion and integral therewith,
   (c) a plurality of closely adjacent, circumferential, V-shaped grooves (18) defined in an outer surface of the body portion and adapted to matingly accommodate a belt having an inner surface defining a like plurality of longitudinally extending, similarly configured V-shaped grooves, and
   (d) a plurality of equally spaced axial grooves (20) defined in the body portion and extending over the entire axial length thereof, including sloping side walls, crowns, and bases of the V-shaped grooves, to increase the coefficient of sliding friction between the pulley and the belt.
2. A pulley according to claim 1, wherein said axial grooves further extend over an inner sidewall and crown of the second flange.

* * * * *